Nov. 8, 1949 R. H. LEACH 2,487,453
SILVER-COPPER-ZINC-CADMIUM ALLOY
Original Filed Aug. 14, 1945
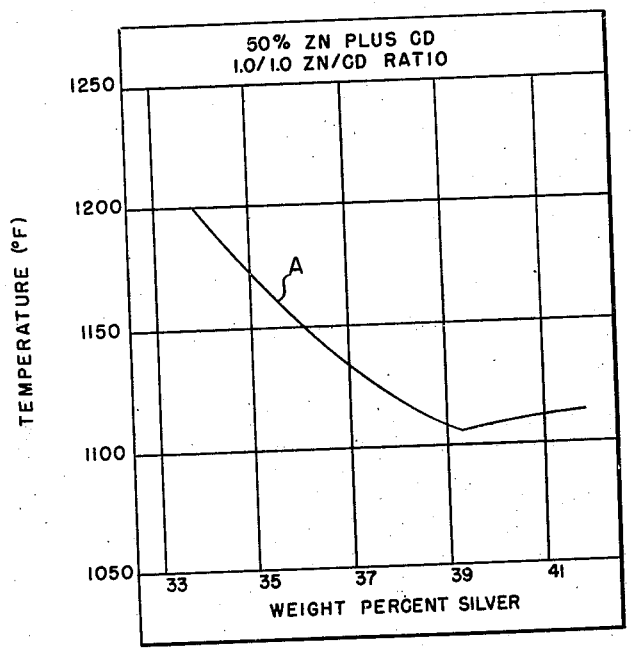
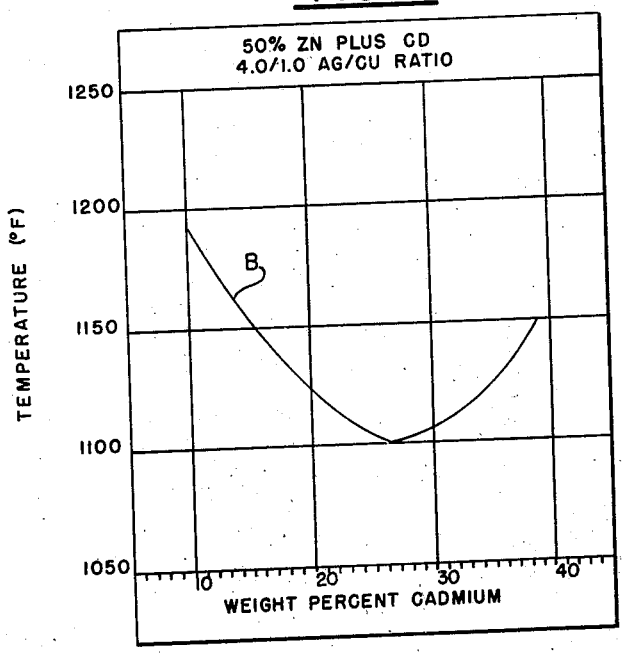
INVENTOR.
ROBERT H. LEACH
BY
ATTORNEYS Patented Nov. 8, 1949

2,487,453

UNITED STATES PATENT OFFICE 2,487,453

SILVER-COPPER-ZINC-CADMIUM ALLOY

Robert H. Leach, Fairfield, Conn., assignor to Handy & Harman, New York, N. Y., a corporation of New York Original application August 14, 1945, Serial No. 610,752. Divided and this application January 21, 1949, Serial No. 72,018

1 Claim. (Cl. 75—134)

This invention relates to alloys for brazing purposes and is concerned more particularly with a novel quaternary alloy of silver, copper, zinc, and cadmium, which possesses important advantages over prior similar quaternary brazing alloys. The new alloy flows freely at a substantially lower temperature than the prior alloys and may, accordingly, be employed to greater advantage in brazing heat-treated steels, since, because of the lower temperature to which they are exposed, such steels suffer less loss of their properties in the brazing operation. Also, the alloy of the invention contains substantially less silver than the prior alloys, and, as silver is many times more expensive than the other components of such alloys, it will be evident that even a relatively small reduction in the amount of silver used greatly reduces the cost. The new alloy may be readily fabricated into usable forms by methods in common use and produces strong joints.

In my Patent No. 2,383,976, which issued on September 4, 1945, I disclosed a quaternary brazing alloy of silver, copper, zinc, and cadmium, containing between 44% and 47.5% silver, and a total amount of zinc and cadmium not exceeding about 40%. In the alloy of that patent, the copper is present in such an amount that the ratio of silver to copper ranges between 2.6 and 3.5, while the ratio of zinc to cadmium varies between 0.9 and 1.2. Alloys of the kind disclosed in the patent have flow points between about 1150° F. and 1160° F.

Further investigation of the properties of quaternary alloys of silver, copper, zinc, and cadmium has brought out peculiar features of such alloys that could not have been predicted from prior knowledge, and the present invention is based on the results of such investigation. Prior to the research referred to, it was to be expected from the available knowledge of the properties of the several components of such alloys, that, as the total amount of zinc and cadmium increased, a corresponding decrease in the flow point would ensue. I have discovered, however, that the total amount of zinc and cadmium present in such a quaternary alloy is not the sole factor determining the flow point, but that, instead, the ratio of zinc to cadmium and the ratio of silver to copper are important. Moreover, there are critical ranges for these ratios, such that in a given alloy, a decrease in the zinc-cadmium ratio to a critical range will produce a decrease in the flow point of the alloy and, when the range is exceeded, will produce an increase. Similarly, an increase in the silver-copper ratio to a critical point will result in a decrease in the flow point of the alloy, but, beyond the critical point, will produce an increase.

The alloy of the present invention is a quaternary alloy of silver, copper, zinc and cadmium containing 39.5% silver and 10.5% copper. The remaining 50% of the alloy composition is composed of the zinc and cadmium in substantially equal proportions, that is, the balance of the alloy comprises 25% zinc and 25% cadmium. This alloy appears to comprise a eutectic composition characterized by a flow point of about 1100° F.

The criticality of the silver and copper contents of the alloy of my invention is illustrated by Fig. 1 of the accompanying drawing. The curve "A" shown in Fig. 1 represents the flow points of quaternary alloys of silver, copper, zinc and cadmium in which the zinc-cadmium content and ratio are maintained constant at 50% and 1/1, respectively, while the relative amounts of silver and copper are varied although totalling 50% in each instance. Thus, when the silver content is about 38%, representing a silver-copper ratio of about 3.2, the flow point is about 1117° F., and it decreases with an increase in the silver, and in the silver-copper ratio, until the silver amounts to about 39.25% with a resulting silver-copper ratio of about 3.6. With this silver content and silver-copper ratio, the alloy has the lowest flow point, namely, 1105° F., but a further increase in the amount of silver and in the silver-copper ratio causes the flow point to rise so that with 40% silver and a silver-copper ratio of 4, for example, the flow point is about 1108° F.

The criticality of the zinc and cadmium contents of the alloy of my invention is illustrated by curve "B" in Fig. 2 of the drawing. The curve represents the flow point of quaternary alloys of silver, copper, zinc and cadmium in which the silver and copper contents, which total 50%, are maintained constant at 40% and 10%, respectively, while the relative amounts of zinc and cadmium are varied although totalling 50% in each instance. It will be noted that these silver and copper contents are substantially those which produced the lowest flow point alloy when a zinc-cadmium ratio of 1/1 was maintained in the balance of the alloy composition. The curve "B" shows that when the cadmium is present in the amount of 23%, representing a zinc-cadmium ratio of about 1.2, the alloy has a flow point of about 1112.5° F. As the cadmium content increases and the zinc-cadmium ratio decreases, the flow point falls until a critical point is reached at 27% cadmium and a zinc-cadmium ratio of about 0.85, when the flow point of the alloy is 1100° F. A further increase in the cadmium with a further decrease in the zinc-cadmium ratio does not continue to lower the flow point; on the contrary, the flow point increases so that an alloy containing 35% cadmium, representing a zinc-cadmium ratio of about 0.4, has a flow point between 1125° F. and 1130° F.

It will be seen from a consideration of curves "A" and "B" that in a quaternary alloy composed of silver, copper, zinc and cadmium, a low flow point of about 1100° F. can be achieved by using 39.5% silver and 10.5% copper, the silver and copper totalling 50% of the alloy, and by making up the remaining 50% of the alloy composition with equal proportions of zinc and cadmium each comprising 25% of the alloy composition. The resulting alloy composition is characterized by a lower flow point and a lower silver content than the alloy of my above-identified prior patent and is therefore superior to said prior alloy composition in utility and cost.

This application is a division of my co-pending application Serial No. 610,752, filed August 14, 1945, now abandoned.

I claim:

A quaternary alloy of silver, copper, zinc and cadmium having a flow point of about 1100° F. and consisting of 39.5% silver, 10.5% copper, 25% zinc and 25% cadmium.

ROBERT H. LEACH.

REFERENCES CITED

The following references are of record in the file of this patent:

UNITED STATES PATENTS

| Number | Name | Date |
|---|---|---|
| Re. 20,638 | Leach | Jan. 25, 1938 |
| 2,196,302 | Hensel et al. | Apr. 9, 1940 |
| 2,235,634 | Hensel et al. | Mar. 18, 1941 |
| 2,310,231 | Goldsmith | Feb. 9, 1943 |
| 2,362,893 | Durst | Nov. 14, 1944 |
| 2,383,976 | Leach | Sept. 4, 1945 |